United States Patent
Yamazaki et al.

(10) Patent No.: US 6,908,105 B2
(45) Date of Patent: Jun. 21, 2005

(54) GAS GENERATOR FOR AIR BAG (75) Inventors: Masayuki Yamazaki, Himeji (JP); Eiichi Ryobo, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 10/606,351

(22) Filed: Jun. 26, 2003

(65) Prior Publication Data

US 2004/0130133 A1 Jul. 8, 2004

Related U.S. Application Data (60) Provisional application No. 60/393,732, filed on Jul. 8, 2002.

(30) Foreign Application Priority Data

Jun. 26, 2002 (JP) ........................ 2002-185678

(51) Int. Cl.[7] ............................................. B60R 21/26
(52) U.S. Cl. ...................................................... 280/737
(58) Field of Search ................................. 280/736, 737, 280/740, 741, 742

(56) References Cited

U.S. PATENT DOCUMENTS

| | | | | |
|---|---|---|---|---|
| 5,462,307 A | * | 10/1995 | Webber et al. ............... | 280/737 |
| 5,794,973 A | * | 8/1998 | O'Loughlin et al. ......... | 280/737 |
| 6,244,622 B1 | * | 6/2001 | Al-Amin et al. .............. | 280/737 |
| 6,247,725 B1 | * | 6/2001 | Moller ........................ | 280/737 |
| 6,557,890 B1 | | 5/2003 | Karlin et al. | |
| 6,629,703 B2 | * | 10/2003 | Horton et al. ............... | 280/737 |
| 6,669,232 B2 | * | 12/2003 | Specht ........................ | 280/736 |

FOREIGN PATENT DOCUMENTS

DE 19933551 A1 1/2001

* cited by examiner

*Primary Examiner*—Faye M. Fleming
(74) *Attorney, Agent, or Firm*—Birch, Stewart, Kolasch & Birch, LLP (57) ABSTRACT

A gas generator for an air bag, which can ensure a reliable activation and an operation performance as designed without adding further members. The gas generator includes a moving body for rupturing a first rupturable plate that closes a first opening provided between a first gas generating chamber and a pressurized medium accommodating chamber, and a second opening and a second rupturable plate for closing the second opening provided at a position deviated from a hitting portion of the moving body rupturing the first rupturable plate.

20 Claims, 6 Drawing Sheets

GAS GENERATOR FOR AIR BAG

CROSS-REFERENCE TO RELATED APPLICATIONS

This nonprovisional application claims priority under 35 U.S.C. § 119(e) on U.S. Provisional Application No. 60/393,732 filed on Jul. 8, 2002 and under 35 U.S.C. § 119(a) on patent application No. 2002-185678 filed in Japan on Jun. 26, 2002, which is/are herein incorporated by reference.

BACKGROUND OF THE INVENTION

1. Field of the Invention

The present invention relates to a gas generator for an air bag which can inflate an air bag securely and can securely obtain such an operation performance as designed, and an air bag system using the same.

2. Description of the Related Art

With a development of a gas generator used in an inflating-type safety system of motor vehicles, a hybrid type gas generator using both a pressurized gas and a gas generating agent is attracting attention. This hybrid type gas generator is one which accommodates a pressurized gas hermetically, releases and discharges the sealed pressurized gas to inflate an air bag in cooperation with a combustion gas generated by a solid gas generating agent.

Since such a hybrid type gas generator must be activated securely when required, a mechanism for securely releasing a sealed pressurized gas charged in the interior of a housing. In many cases, a rupturable plate is used as sealing means for a pressurized gas, and the sealed state is released by rupturing this rupturable plate. Then, for rupturing the rupturable plate, a pressure in a pressurized gas accommodating space, which is raised by a flame (or by heat, hereinafter, which is used in the same manner) or a gas generated due to combustion of a solid gas generating agent, breaking a sealing member with a projectile or a moving body, or an impact wave, a flame, a gas generated at a time of activation of an igniter, or the like is used. In rupturing the rupturable plate securely to secure activation of the gas generator, it is especially desirable to rupture the sealing member by using the projectile, the moving body or the like among these means.

In recent years, regarding the hybrid type gas generator, one, which can adjust the degree of inflation of an air bag in response to an impact to restrain a passenger at the activation, has been provided. Specifically, such a gas generator is generally constituted such that two igniters which can be activated individually and independently are included, and rupturable plates corresponding to respective igniters are provided, discharge of a gas starts when a main rupturable plate is ruptured by activation of a main igniter and an amount of a discharged gas is increased when an auxiliary igniter is activated. In order to guarantee a reliable rupture of the main rupturable plate, as described above, a hybrid type gas generator using a projectile or a moving body has also been provided.

As a gas generator in which the degree of inflation of an air bag can be adjusted, a hybrid type gas generator in which a pressurized gas, and solid gas generating agents accommodated in a plurality of combustion chambers has also been known.

For example, German patent publication DE19933551A1 discloses a hybrid type inflating apparatus provided with two charges, which can be ignited at predetermined time accurately without any mutual influence, has been shown. The hybrid type inflating apparatus is constituted such that an opening of a gas chamber accommodating a compression gas is closed by a rupturable plate, charges are provided on both sides of the gas chamber, and closing means for closing the opening of the gas chamber is removed by pressing a piston (a plug body) due to combustion of the charges.

However, the piston (the plug body) shown in this document is in contact with the rupturable plate before activation, and a remarkable energy (pressure) is required for pushing a moving body. For this reason, the moving body is hard to move, and it becomes difficult to remove the rupturable plate reliably. In some cases, there is a possibility that an internal pressure in a charge chamber rises abnormally, and breaks a housing. Particularly, it is considerably important to remove the rupturable plate securely and improve an operation security of a gas generator for an air bag because of the relationship with the usage thereof.

Further, when an inflation degree of an air bag is adjusted according to an impact, it is important to activate a gas generator as designed, and therefore it is needed that rupturable plates provided to correspond to respective igniters are ruptured due to only activation of the corresponding igniters and they are not ruptured unintentionally.

Furthermore, since complication of the structure of a gas generator causes increases in number of manufacturing steps and manufacturing cost and an increase in volume of the gas generator causes inconvenience in relationship with an arrangement space, it is necessary to avoid complication of the structure of the gas generator and an increase of the volume thereof.

However, a gas generator for an air bag satisfying all the above requirements has not been provided yet.

SUMMARY OF THE INVENTION

Therefore, an object of the present invention is to provide a gas generator for an air bag which can sufficiently obtain a reliability at an initiation of an operation and in which an operation performance as designed can be obtained securely without adding further members, and an air bag system using the same.

A gas generator for an air bag according to the present invention is constituted such that, by using a moving body provided with a projecting portion for rupturing a rupturable plate and applying sufficient energy to the moving body, the rupturable plate (a first rupturable plate) can be ruptured securely, a position of another rupturable plate (a second rupturable plate) is defined, so that the another rupturable plate is not ruptured by the moving body after it has ruptured the first rupturable plate.

That is, a gas generator for an air bag according to the present invention is a gas generator for an air bag used in an inflating-type safety system of a vehicle, provided with, in a gas generator housing, a pressurized medium accommodating chamber charged with a pressurized medium and a plurality of gas generating chambers partitioned from the pressurized medium accommodating chamber, wherein the pressurized medium accommodating chamber is provided with openings corresponding to the respective gas generating chambers and respective openings are closed by rupturable plates, the gas generator is provided with a moving body for rupturing a rupturable plate (a first rupturable plate) for closing an opening (a first opening) corresponding to at least one gas generating chamber (a first gas generating chamber), the first gas generating chamber has a single gas ejecting port for ejecting a gas inside the first gas generating chamber, the moving body is provided with a projecting portion facing the first rupturable plate and is disposed to be away from the first rupturable plate, and another opening (a second opening) and another rupturable plate (a second rupturable plate) closing the another opening is provided inside the pressurized medium accommodating chamber at a position deviated from a hitting portion of the propelled moving body.

The moving body is used for rupturing the rupturable plate (the first rupturable plate) to seal the pressurized medium accommodating chamber. The moving body is disposed away from the first rupturable plate, and it is desirable that the moving body is provided to face the gas ejecting port provided in the first gas generating chamber or fitted in the gas ejecting port. When the gas generator is activated in this state, a gas from the gas ejecting port acts on the moving body effectively. That is, since the gas in the first gas generating chamber is concentrically supplied to the moving body, energy loss at the time when the moving body is pushed toward the first rupturable plate is reduced. Further, in the gas generator with this constitution, since the moving body has an initial velocity when the moving body strikes the first rupturable plate (namely, the moving body strikes the first rupturable plate at some velocity), the first rupturable plate can be ruptured securely.

Then, since the another opening (the second opening) and the rupturable plate (the second rupturable plate) for closing the same are provided at a position deviated from the hitting portion of the moving body after it ruptures the first rupturable plate, striking of the moving body with the projecting portion can be avoided and unintentional opening can be prevented. In this description, the second opening indicates all the openings other than the opening (the first opening) facing the moving body, and when two or more openings other than the first opening are provided, the two or more openings correspond to the second opening.

The hitting portion of the moving body indicates part of (one portion) of an inner wall surface defining the pressurized medium accommodating chamber which the moving body, after piercing the first rupturable plate and passing through the interior of the pressurized medium accommodating chamber, strikes, and it is a portion of the inner wall surface defining the pressurized medium accommodating chamber which the moving body strikes. Particularly, when the hitting portion is formed to exist in extension of an imaginary line connecting the moving body and the first rupturable plate, a position (a position deviated from the hitting portion) of the second opening and the second rupturable plate closing the same can be determined easily. The second opening and the second rupturable plate closing the same are desirably formed to avoid not only the hitting portion but also its vicinity.

According to the above-described invention, therefore, a gas generator for an air bag which combines contrary effects such that unintentional rupturing of the second rupturable plate can be avoided while the first rupturable plate can be ruptured securely.

For example, in the case of a hybrid type gas generator which accommodates solid gas generating agents generating a combustion gas by combustion in a first gas generating chamber and a second gas generating chamber, when the gas generating agent in the second gas generating chamber is burnt after the gas generating agent in the first gas generating chamber is burnt (for example, 40 msec after), the moving body strikes the second rupturable plate to rupture the second rupturable plate and open the second opening if the second rupturable plate exists at the hitting portion. Therefore, even if the gas generating agent in the second gas generating chamber is ignited after the gas generating agent in the first gas generating chamber is ignited, for example, after 40 msec, combustion occurs in a state that the pressure in the second gas generating chamber is low as far as the second opening is opened, so that not only the combustion is not completed within a predetermined time but also an undesirable gas such as CO, Nox, and the like is increased due to combustion in lack of pressure in certain circumstances.

Further, when flammable gas and inflating gas are contained in the first gas generating chamber and the second gas generating chamber, the moving body leaped by a pressure of the first gas generating chamber ruptures the second rupturable plate to open the second opening like the above. In this case, even though the magnitude of a collision is small and a gas is sufficiently supplied by activation of only the first gas generating chamber, an additional gas from the second gas generating chamber is generated, so that the inflating speed and the inflating degree of the bag become large to give an excessive impact to a passenger.

According to the gas generator of the present invention, since the second rupturable plate is prevented from being ruptured by the moving body and unintentional opening of the second opening can be avoided, such an inconvenience that an undesirable gas component is increased or an excessive impact is applied to a passenger can be solved.

The pressurized medium accommodating chamber can be formed in a column shape, and it may be formed in, for example, a triangular prism shape, a rectangular column shape, or another polygonal column shape in addition to a circular column shape. Particularly, by forming the pressurized medium accommodating chamber in the circular column shape, a strength of members defining the pressurized medium accommodating chamber can be increased. In the case of the pressurized medium accommodating chamber formed in the column shape, it is desirable to form the openings at its both end portions.

Besides the igniter activated by receiving an activation signal is disposed in the gas generating chamber, the igniter and a gas generating agent burnt by activation of the igniter can further be disposed therein. As described above, naturally, a material generating a gas such as a mixture of a pressurized gas and a flammable gas or the like other than the solid gas generating agent may be used. In this case, a member for sealing such a mixed gas is disposed in the gas ejecting port and the flammable gas is burnt by activation of the igniter to heat the pressurized gas, thereby increasing pressures in the first and second gas generating chambers. When a pressure in the first gas generating chamber rises, the member sealing the gas ejecting port is ruptured and a gas flows into the pressurized medium accommodating chamber. In the case of providing also a gas generating agent, a charging amount of the pressurized medium can be reduced, so that a charging pressure for the pressurized medium can be decreased. Further, the thickness of the housing can be made thin, and the weight of the gas generator can be decreased as a whole. Particularly, when the moving body is leaped by the pressure generated inside the first gas generating chamber to rupture the first rupturable plate and to run into the pressurized medium accommodating chamber, with a gas generating agent included in the first gas generating chamber, more sufficient pressure can be generated for making the moving body leap. Additionally, by making the moving body leap with a pressure generated inside the first gas generating chamber to rupture the first rupturable plate, operation reliability in the gas generator can be enhanced without any complicated structure.

As described above, desirably, the first gas generating chamber includes the gas generating agent, and, in this case, it is desirable to provide a gas ejecting chamber between the first gas generating chamber and the pressurized medium accommodating chamber. If such a gas discharging space is provided, the pressurized medium flowing from the first opening and a gas generated by combustion of the gas generating agent and flowing from the first gas generating chamber can be mixed effectively. Consequently, the mixture is discharged from the plurality of gas discharging ports formed circumferentially on the gas ejecting chamber, which is desirable.

When the gas ejecting chamber is provided, a retainer is fixed in this space so that the moving body can be held by the retainer. If the center of the gas ejecting port, the center of the moving body and the center of the first rupturable plate are arranged in the almost same line, a leaping direction of the moving body is specified, and the position of the second opening can be determined easily. Further, by arranging the center of the gas ejecting port and the center of the moving body to meet each other, a gas ejected from the gas ejecting port can effectively work on the moving body. The gas ejecting port is preferably closed by a moisture-proof seal tape before actuation of the gas generator.

In addition, the moving body can be held inside the gas ejecting port provided in the first gas generating chamber and be provided between the pressurized medium accommodating chamber and the firs gas generating chamber.

The second opening is an opening existing in the all gas generating chambers (the second gas generating chamber side) side except for the first gas generating chamber, and desirably, the rupturable plate (the second rupturable plate) which closes the second opening is ruptured by a pressure produced by combustion of the gas generating agent charged in the second gas generating chamber.

In the present invention, when the pressurized medium is ejected from the first opening opened by the first rupturable plate ruptured by the moving body and is discharged from the housing through the gas discharging port, a gas generated inside the second gas generating chamber once flows in the pressurized medium accommodating chamber to thermally expand the pressurized medium, if remained inside the pressurized medium accommodating chamber, and then, is discharged from the first opening. The gas generated in the second gas generating chamber is used for inflating an air bag supplementally, or for adjusting a discharged amount of the gas, and thereby, desirably, a gas generating agent is provided in the second gas generating chamber in order to widely adjust a discharged amount of the gas.

As the pressurized medium which can be used in the present invention, in addition to a conventionally known gaseous pressurized medium, liquefied medium can also be used. As the gaseous pressurized medium, for example, such an inert gas as argon, helium or the like (nitrogen is also included in the inert gas in this invention) can be used. In this case, argon works to promote the thermal expansion of the pressurized medium, and when helium is contained in the pressurized medium, the leakage of the pressurized medium can be detected easily, and consequently, distribution of imperfect products can be prevented. Further, as the liquefied pressurized medium, carbon dioxide or dinitrogen monoxide can be used.

Moreover, examples of the gas generating agent which can be charged in the gas generating chamber can be a gas generating agent including a fuel and an oxidizing agent, or a gas generating agent including a fuel, an oxidizing agent, and a slag-forming agent, a gas generating agent obtained by mixing with a bonding agent, if required, and forming the mixture in a desired shape. When such a gas generating agent is used, a gas produced by combustion can be provided for inflation and development of an air bag together with the pressurized medium. Especially, when a gas generating agent including a slag-forming agent is used, it becomes easier to form a slag, so that an amount of mist-like combustion residues discharged from the gas generator towards an air bag can be largely reduced. In this case, if an amount of a charged gas generating agent is small and an amount of a generated residue is small, it is unnecessary to use the slag-forming agent.

Preferably, the fuel can be one or two or more materials selected from the group consisting of guanidine derivatives such as nitroguanidine (NQ), guanidine nitrite (GN), guanidine carbonate, amino nitroguanidine, amino guanidine nitrite, amino guanidine carbonate, diamino guanidine nitrite, diamino guanidine carbonate, and triamino guanidine nitrite. As the fuel, one or two or more materials selected from the group consisting of tetrazole and tetrazole derivatives can be used.

Preferably, the oxidizing agent can be one or two or more materials selected from the group consisting of strontium nitrate, potassium nitrate, ammonium nitrate, potassium perchlorate, copper oxide, ferrous oxide, and a basic copper nitrate.

Preferably, the slag-forming agent can be one or two or more materials selected from the group consisting of acid clay, talc, bentonite, diatomaceous earth, kaolin, silica, alumina, sodium silicate, silicon nitride, silicon carbide, hydrotalsite, and a mixture thereof.

Preferably, the bonding agent can be one or two or more materials selected from the group consisting of sodium salt of carboxymethylcellulouse, hydroxyethyl cellulose, starch, polyvinyl alcohol, guargum, microcrystal cellulose, polyacrylamide, and calcium stearate.

In the description of the gas generator of the above-described invention, the first gas generating chamber can be defined as a gas generating chamber which generates a pressure for moving the moving body at a time of actuation of the gas generator or a gas generating chamber which is provided in the gas discharging port side of the gas generator, the first opening can be defined as an opening which is opened by the moving body, an opening which discharges the pressurized medium, or an opening which is provided in the gas discharging port side of the gas generator, and the first rupturable plate can be defined as a rupturable plate which is ruptured by the moving body or a rupturable plate which is provided in the gas discharging port side of the gas generator.

Then, the second gas generating chamber can be defined as a gas generating chamber which generates a gas flowing into the pressurized medium accommodating chamber at a time of activation of the gas generator, a gas generating chamber which generates a gas simultaneously with the first gas generating chamber or with a slight delay or a gas generating chamber which generates a gas inflating the pressurized medium or working supplementally, the second opening can be defined as an opening guiding a gas in the second gas generating chamber to the pressurized medium accommodating chamber or an opening opened by a pressure inside the second gas generating chamber, and the second rupturable plate can be defined as a rupturable plate which closes the second opening or a rupturable plate which is ruptured by a pressure of the second gas generating chamber.

Further, the present invention provides, as another means for solving the above-described problem, an air bag system comprising actuation signal-outputting means having an impact sensor and a control unit, and a module case accommodating the above-described gas generator for an air bag and an air bag.

According to the present invention, a gas generator for an air bag which can ensure a sufficient reliability at an initiation of an operation and in which an operation performance as designed can be obtained securely without adding further members, and an air bag system using the same are provided.

Further, the present invention provides a gas generator for an air bag which simultaneously combines contrary effects such that unintentional rupturing of the second rupturable plate can be avoided while the first rupturable plate can be ruptured securely.

DETAILED DESCRIPTION OF THE PRESENT INVENTION

Embodiments of the present invention will be explained as follows according to the drawings, but the invention is not limited to these embodiments.

Embodiment 1

Figure 1:
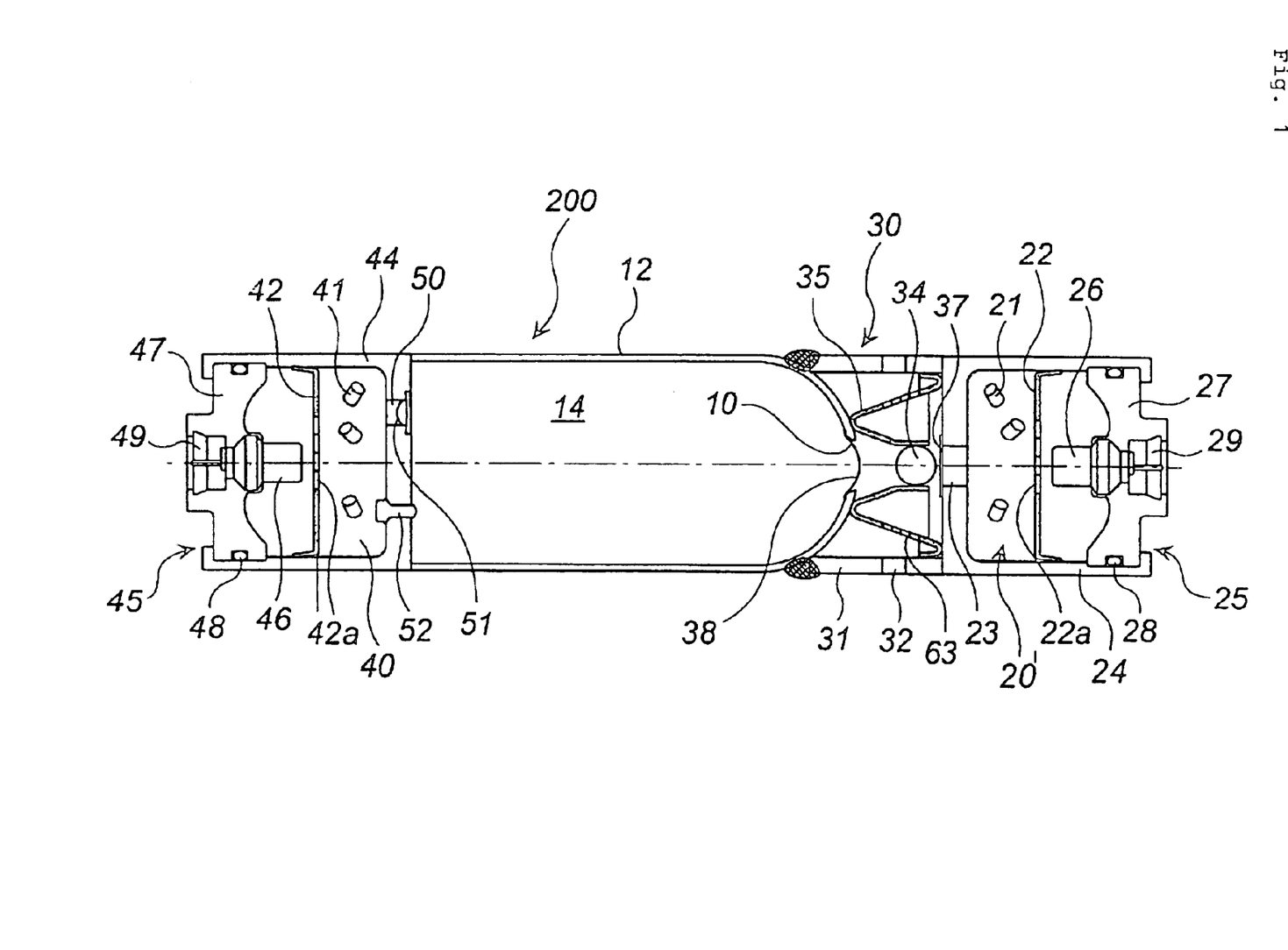
FIG. 1 is an axial sectional view of a hybrid type gas generator.

FIG. 1 is an axial sectional view of a gas generator for an air bag of a so-called dual type provided with two igniters and two gas generating chambers, in particular, a hybrid type gas generator 200 that utilizes a pressurized medium and a solid gas generating agent.

The hybrid type gas generator 200 comprises a cylindrical gas generator housing 12 accommodating the pressurized medium, first and second gas generating chambers 20, 40 provided at both ends of the gas generator housing 12, first and second ignition means accommodating chambers 25, 45, and a diffuser portion 30 provided between the gas generator housing 12 and the first gas generating chamber 20. The interior of the diffuser portion 30 serves as a gas outlet chamber. In this embodiment, as a pressurized medium, a liquefied gas (for example, liquefied $CO_2$) is used. With respective to these chambers, outer shells thereof can be formed by at least two housings and the respective housings are integrated by fixing means such as welding, or respective chambers may be accommodated in one housing, for example, in the gas generating chamber housing 12.

An outer shell of the first gas generating chamber 20 is formed by a first gas generating chamber housing 24, and a required amount of first gas generating agent 21 is charged therein. The volume of the first gas generating chamber 20 is adjusted by moving a retainer 22, having a required number of holes 22a, according to an amount of the first gas generating agent 21.

By partitioning the interior of the first gas generating chamber 20 by the retainer 22, a first ignition means accommodating chamber 25 accommodating a first igniter 26 is obtained. An outer shell of the first ignition means accommodating chamber 25 is formed by the first gas generating chamber housing 24, and the first igniter 26 is fitted to a collar 27 attached to the housing 24. Reference numeral 28 denotes an O-ring, and 29 denotes a connector.

An outer shell of the diffuser portion 30 is formed by a diffuser portion housing 31, the diffuser portion 30 is formed by being closed by an end surface of the gas generator housing 12 and an end surface of the first gas generating chamber housing 24. A required number of gas discharging ports 32 are provided in a peripheral wall of the diffuser portion housing 31.

A moving body 34 for rupturing a first rupturable plate 38 is provided inside the diffuser portion 30. In this embodiment, a ball-like rupturing means 34 provided with a spherical projecting portion is used, and it is supported and fixed by an annular supporting member 35. The ball-like rupturing means 34 is made of metal having the same material as that of the first rupturable plate 38, and the diameter thereof is set to be smaller than that of an opening after the first rupturable plate 38 is ruptured.

Figure 2:
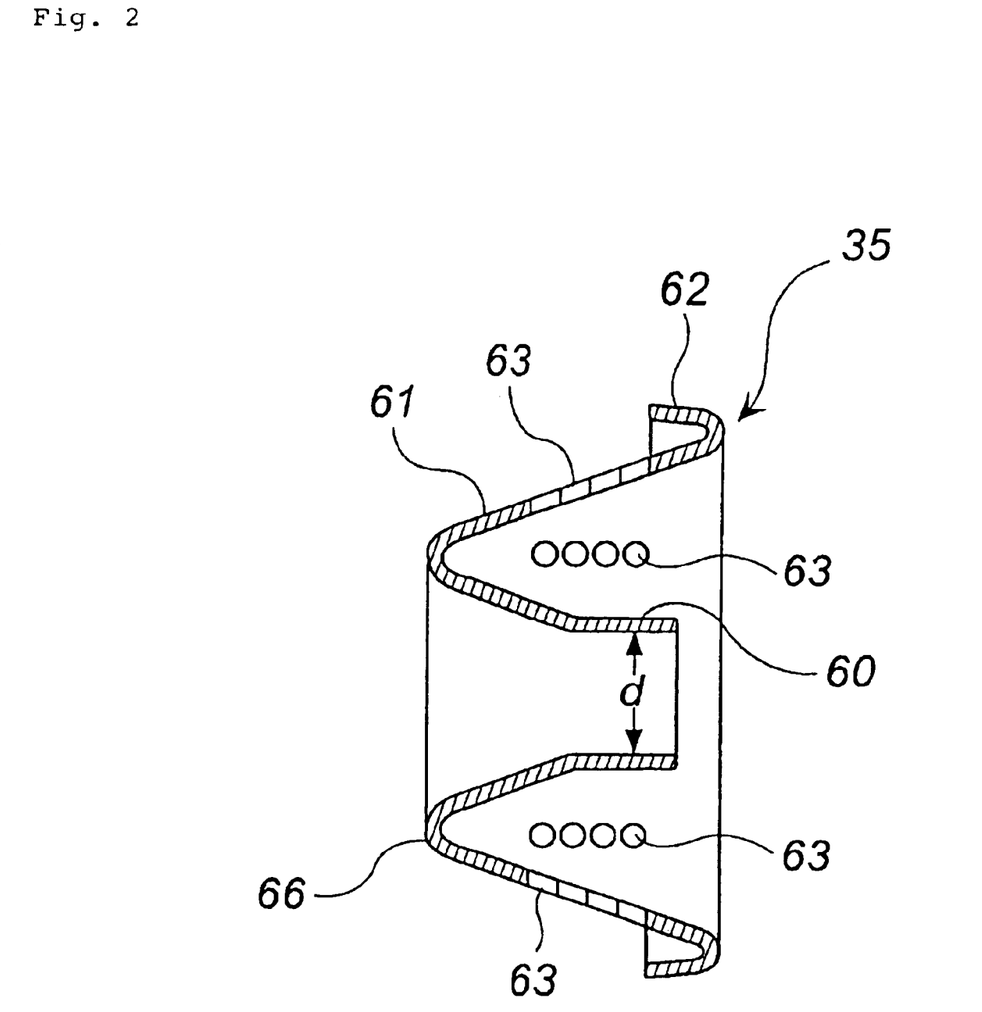
FIG. 2 is an enlarged view of an annular supporting member in FIG. 1.

As shown in FIG. 2, the annular supporting member 35 has a section in a shape of substantially W-letter and is formed of an elastic material such as metal. The annular supporting member 35 has a central cylinder 60 and an annular peripheral wall 61. An annular bent portion 62 folded in a U-letter shape is formed at a distal end of the annular peripheral wall 61. The annular supporting member 35 is fixed by making an annular base portion 66 of the central cylinder 60 abut against an end surface of the gas generator housing 12 and making the annular bent portion 62 press against an inner surface of the diffuser portion housing 31.

The central cylinder 60 has such a flask-like shape that its diameter is gradually enlarged toward the first rupturable plate 38, and the ball-like rupturing means 34 is pressed and supported by a resilience of the central cylinder 60. For this reason, when the ball-like rupturing means 34 is released, the central cylinder 60 serves as a guiding path which properly guides the ball-like rupturing means 34 to the first rupturable plate 38, and the central cylinder 60 is deformed such that its diameter d becomes smaller due to its resilience, and thereby, the ball-like rupturing means 34 after rupturing the first rupturable plate 38 is prevented from jumping out through the central cylinder 60 and closing a gas ejecting port 23. Consequently, a flow path is prevented from being closed.

A required number of gas flow holes 63 are provided in the annular peripheral wall 61, and the gas flow holes 63 allow a liquefied gas and a combustion gas to pass through and also, it serves as a filter for removing pieces of the ruptured first rupturable plate 38.

The first gas generating chamber 20 and the diffuser portion 30 are in communication with each other through the gas ejecting port 23 provided in the first gas generating chamber housing 24, and the gas ejecting port 23 is closed by a sealing tape 37. Moisture entering from the gas discharging port 32 is prevented from entering the first gas generating chamber 20 by the sealing tape 37.

There is a single ejecting port 23, and the ball-like rupturing means 34 is disposed in the vicinity of the single gas ejecting port 23 and is disposed apart from the first rupturable plate 38. For this reason, all the gas inside the first gas generating chamber 20 discharged from the single gas ejecting port 23 and it collides against the ball-like rupturing means 34 effectively and push the same toward the first rupturable plate 38 to rupture the plate. Thereby, since the ball-like rupturing means 34 collides against the first rupturable plate 38 with a considerable speed, the first rupturable plate 38 can be ruptured unfailingly. Further, since the ball-like rupturing means 34 is provided with a spherical projecting portion, a pressure can be concentrated to an extremely small area at a time of rupturing of the first rupturable plate 38 described later, and consequently the first rupturable plate 38 can be ruptured securely.

A pressurized medium accommodating chamber 14 is surrounded by the gas generator housing 12, the first rupturable plate 38, a second gas generating chamber housing 44, and a second rupturable plate 51, and liquefied gas is charged therein hermetically. The liquefied gas (the pressurized medium) charged in this space 14 is released when the first rupturable plate 38 is ruptured and a first opening 10 is opened, and it is discharged outside the housing. The liquefied gas is charged from a charging hole before closed by a sealing pin 52 and the charging hole is closed by welding a portion of the sealing pin 52 after charging the liquefied gas. A critical temperature (a temperature such that, even though any pressure is applied to a material at a temperature higher than the critical temperature, the material is not aggregated) of carbon dioxide is 31° C., and when a liquefied carbon dioxide is especially used as the liquefied gas, and carbon dioxide is not liquefied due to a charging pressure or an environmental temperature, so that there occurs such a case that carbon dioxide exists still in a gaseous state. When carbon dioxide is liquefied, for example, in the case of using solid gas generating agents 21, 24 in the first and second gas generating chamber 20, 40, the carbon dioxide instantaneously vaporizes due to combustion heat of these solid gas generating agents 21, 24 to form an inflating fluid for an air bag inflation.

The diffuser portion 30 and the pressurized medium accommodating chamber 14 of the gas generator housing 12 communicates with each other due to that the first rupturable plate 38 is ruptured so that the first opening 10 (the diameter thereof being larger than that of the ball-like rupturing means 34) provided at an end portion of the gas generator housing 12 is opened. The first rupturable plate 38 is welded and fixed to the gas generator housing 12.

An outer shell of the second gas generating chamber 40 is formed by the second gas generating housing 44, and a required amount of a second gas generating agent 41 is charged therein. A volume of the second gas generating chamber 40 is adjusted by moving a retainer 42 having a required number of holes 42a according to an amount of the second gas generating agent 41.

A second ignition means accommodating chamber 45 defined by the retainer 42 is provided inside the second gas generating chamber 40. An outer shell of the second ignition means accommodating chamber 45 is formed by the second gas generating chamber housing 44, and a second igniter 46 fitted to a collar 47 is supported by the housing 44. Reference numeral 48 denotes an O-ring and reference numeral 49 denotes a connector.

The second gas generating chamber 40 and the pressurized medium accommodating chamber (a liquefied gas charged space) 14 charged with the pressurized medium (the liquefied gas) communicate with each other via a second opening 50 provided in the second gas generating chamber housing 44, and the second opening 50 is closed by a second rupturable plate 51. The second rupturable plate 51 is welded and fixed to the second gas generating chamber housing 44.

In this invention, the second opening 50 and the second rupturable plate 51 closing the opening 50 are provided at a position deviated from the hitting portion of the moving body (the ball-like rupturing means 34) for rupturing the first rupturable plate.

That is, in this embodiment, the ball-like rupturing means 34 receives a pressure inside the first gas generating chamber 20, which ejects from the gas ejecting port 23 provided at an opposite position to the ball-like rupturable means 34, to move the rupturable means 34. For this reason, after the ball-like rupturing means 34 ruptures the first rupturable plate 38, it advances inside the pressurized medium accommodating chamber 14, and finally, strikes the end surface of the pressurized medium accommodating chamber in the second gas generating chamber housing 44 side, which existing in the extension of the gas ejecting port 23, a position in which the ball-like rupturable means is originally provided, and the first rupturable plate 38 (this struck point corresponds to the hitting portion). Therefore, by forming the second opening 50 and the second rupturable plate 51, closing the same, at a position deviated from a position which the ball-like rupturing means 34 strikes, specifically, at a position eccentric to the axial center of the gas generator housing 12, such a drawback that the second opening 50 is opened by the ball-like rupturing means 34 unintentionally can be eliminated.

Especially, in this embodiment, since the ball-like rupturing means 34 and the gas ejecting port 23 are provided to face each other and both are formed at positions on the axial center of the gas generator housing 12, a portion which the leaped ball-like rupturing means 34 strikes (namely, the hitting portion) can be specified easily, and positions of the second opening 50 and the second rupturing plate 51 can be selected easily.

The hybrid type gas generator 200 uses a pressurized medium and a combustion gas of the gas generating agent in combination as inflating means for an air bag, in which a liquefied gas is especially used as the pressurized medium, and evaporation of liquefied gas is promoted by the combustion gas to enhance an operation performance of the hybrid type gas generator 200. A required amount of liquefied gas such as carbon dioxide is charged into the pressurized medium accommodating chamber 14, and the first and second gas generating agents 21, 41 comprising a required amount of a non-azide gas generating agent are accommodated in the first and second gas generating chambers 20, 40, respectively.

The gas generating agents 21 and 41 include one or at least two selected from the group consisting of triadine derivatives, tetrazole derivatives, triazole derivatives, guanidine derivatives, derivatives of azodicarbonamide, and hydrazine derivatives as the fuel, and preferably include ammonium nitrate as an oxidizing agent. More specifically, guanidine nitrate/ammonium nitrate/potassium nitrate/ additive (a binder, an additive) and nitroguanidine/phase-stabilized ammonium nitrate/additive (a binder, an additive) can be used.

Next, an operation of an air bag system incorporated with the hybrid type gas generator 200 will be explained with reference to FIG. 1 and FIG. 2.

When a vehicle collides, the first igniter 26 is actuated upon receiving an actuation signal from a control unit (not shown) to burn the first gas generating agent 21 in the first gas generating chamber 20. A generated combustion gas breaks the sealing tape 37 and ejected from the gas ejecting port 23 to push and move the ball-like rupturing means 34. After the ball-like rupturing means 34 which receives a pressure due to the combustion gas being released from the annular supporting member 35 to strike the first rupturable plate 38 and securely rupture the first rupturable plate 38 owing to action of its projecting portion, it leaps into the liquefied gas charged space 14, and strikes the end surface (the hitting portion) of the pressurized medium accommodating chamber 14 in the second gas generating chamber housing 44 side, existing in the extension of the gas ejecting port 23, a position in which the ball-like rupturable means is originally provided, and the first rupturable plate 34. At this time, since the second rupturable plate is formed at a position deviated from the hitting position, specifically, at a position eccentric from the axial center of the gas generator housing 12, it is not ruptured by collision of the ball-like rupturing means 34. The ball-like rupturing means 34 which struck the hitting portion remains inside the pressurized medium accommodating chamber 14 owing to its own weight against an ejecting pressure of the gas.

The charged liquefied gas immediately gasified by a temperature increased due to inflow of the combustion gas having a high temperature into the liquefied gas charged space 14 and a rapid pressure-reduction in the pressurized medium accommodating chamber 14 due to rupturing of the first rupturable plate 38, and the gas is discharged from the gas discharging ports 32 via the central cylinder 60 of the annular supporting member 35 and the gas flow holes 63 of the annular peripheral wall and then, inflates the air bag. Incidentally, when the ball-like rupturing means 34 is released, the central cylinder 60 of the annular supporting member 35 deforms inwardly to narrow its diameter d, so that the ball-like rupturing means 34 leaped into the liquefied gas charged space 14 is prevented from leaping out of the central cylinder 60 and closing the gas ejecting port 23. Thereby, a gas flow path to the gas discharging port 32 is never closed.

Similarly, the second igniter 46 is actuated upon receiving an actuation signal from the control unit with a slight delay from the actuation of the first igniter 26, and it burns the second gas generating agent 41 in the second gas generating chamber 40. A generated combustion gas flows into the second opening 50 to rupture the second rupturable plate 51, then, into the pressurized medium accommodating chamber 14 and is discharged together with the remaining liquefied gas from the gas discharging ports 32 to inflate the air bag.

Thus, by generating a combustion gas in two stages, the hybrid type gas generator 200 described above prevents a delay in an air bag inflating operation at a time of collision of a vehicle with an action of the first gas generating chamber 20 and discharges the pressurized medium in the gas generator housing 12 completely with an action of the second gas generating chamber 40, thereby allowing instantaneous inflation of the air bag to a sufficient degree of safety. Further, since two gas generating chambers are provided and these chambers can be actuated absolutely independently, the present invention can also meet an embodiment such that a combustion gas is generated only from the first gas generating chamber 20, or that a combustion gas generating timings in the first and second gas generating chambers 20, 40 are properly adjusted to a desirable interval.

Embodiment 2

Figure 3:
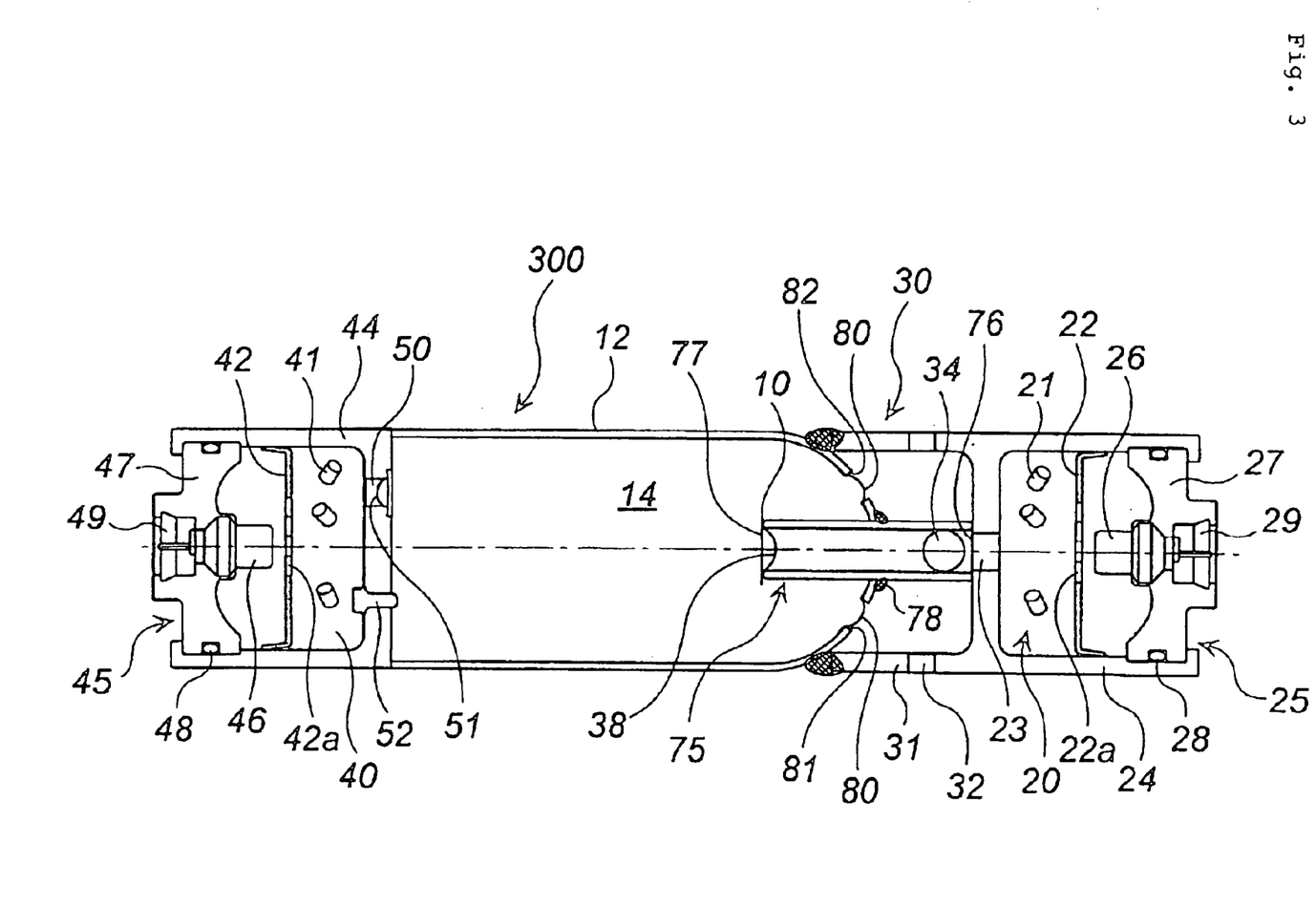
FIG. 3 is an axial sectional view of a hybrid type gas generator of another embodiment.

A second embodiment will be explained with reference to FIG. 3. FIG. 3 shows a dual type gas generator for an air bag having two igniters and gas generating chambers, which is an axial sectional view of a hybrid type gas generator 300 especially using a pressurized medium and a solid gas generating agent. The hybrid type gas generator 300 and the hybrid type gas generator 200 shown in FIG. 1 are different in constitution of a discharging path of a combustion gas and internal constitution of the diffuser portion 30, but they are identical in the other constitution. Therefore, the same constitutional portions are attached with the same reference numerals, explanation thereof will be omitted, and only different constitution portions will be explained. In this case, a filter (a wire mesh, punched metal or the like) for preventing broken pieces of a first rupturable plate 38, a second rupturable plate 51, and a third rupturable plate 80 from flowing into an air bag can be provided at a position facing a gas discharging port 32 in the diffuser portion 30.

A gas ejecting port 23 provided in the gas generating chamber housing 24 and the liquefied gas charged space 14 are in communication with each other through a cylindrical combustion gas introducing pipe 75, and the combustion gas generated in the gas generating chamber 20 does not flow into the diffuser portion 30 directly, but it flows into the diffuser portion 30 after flowing into the liquefied gas charged space 14.

An opening at one end of the combustion gas introducing pipe 75 abuts against an end surface of the gas generating chamber housing 24 to surround the gas ejecting port 23 with such a pressing force that it blocks entering of moisture into the gas generating chamber 20. An opening 77 at the other end of the combustion gas introducing pipe 75 is positioned in the liquefied gas charged space 14, and the opening 77 is closed by the first rupturable plate 38 hermetically. The combustion gas introducing pipe 75 and a side end surface of the diffuser portion 30 of the gas generator housing 12 are welded at a welding portion 78.

A ball-like rupturing means 34 is inserted into the combustion gas introducing pipe 75. An inner diameter of the combustion gas introducing pipe 75 and a diameter of the ball-like rupturing means 34 are adjusted such that movement of the ball-like rupturing means 34 is blocked before actuation but the ball-like rupturing means 34 can easily move upon receiving a pressure of the combustion gas generated in the gas generating chamber 20 at actuation.

The required number of openings 81, 82 are provided on a side surface of the gas generator housing 12 in the diffuser portion 30 side, these openings are closed by a third rupturable plate 80. The openings 81 and 82 closed by the third rupturable plate 80 serve as discharging paths for the liquefied gas in the liquefied gas charged space 14 and the combustion gas towards the diffuser portion 30. The diameters of these openings 81 and 82 are set to be smaller than that of the ball-like rupturing means 34.

Next, an operation of an air bag system incorporated with the hybrid type gas generator 300 will be explained with reference to FIG. 3.

When a vehicle collides, the first igniter 26 is actuated upon receiving an actuation signal from the control unit (not shown) to burn the first gas generating agent 21 in the first gas generating chamber 20. The generated combustion gas flows from the gas ejecting port 23 into the combustion gas introducing pipe 75 to press the ball-like rupturing means 34. In this embodiment, particularly, since the ball-like rupturing means 34 is guided to well inside the pressurized medium accommodating chamber 14 by the combustion gas introducing pipe 75, a leaping direction in the pressurized medium accommodating chamber 14 can consequently be specified. Specifying the hitting portion can be made easy, and mixing with the pressurized medium (the liquefied gas) is conducted sufficiently and vaporization of the liquefied gas is further promoted.

In the structure shown in FIG. 3, the ball-like rupturing means 34 is disposed inside the combustion gas introducing pipe 75 and an outer diameter of the rupturing means 34 and an inner diameter of the introducing pipe 75 are adjusted such that the ball-like rupturing means 34 does not clank in the introducing pipe 75. Then, the structure shown in FIG. 3 is a structure which moves the rupturing means 34 with a gas generated inside the first gas generating chamber 20 to rupture the first rupturable plate 38, and the introducing pipe 75 extends towards the interior of the accommodating chamber 14 such that a high pressure gas from the first gas generating chamber 20 comes in contact with the pressurized medium (the liquefied gas) sufficiently. With a long introducing pipe 75, it becomes resistant when the ball-like rupturing means 34 moves and makes difficult to rupture the first rupturable plate 38. Preferably, an inner diameter of the introducing pipe 75 is made gradually larger towards the pressurized medium accommodating chamber 38, so that the pipe does not become resistant when the ball-like rupturing means 34 moves.

After the ball-like rupturing means 34 receives a pressure due to the combustion gas, it moves inside the combustion gas introducing pipe 75 to collide against the first rupturable plate 38 and it securely ruptures the first rupturable plate 38 owing to action of its projecting portion. Thereafter, it leaps into the liquefied gas charged space 14, and, strikes the end surface (the hitting portion) of the pressurized medium accommodating chamber in the second gas generating chamber housing 44 side, which existing in the extension of the gas ejecting port 23, a position in which the ball-like rupturable means is originally provided, and the first rupturable plate 34. At this time, since the second rupturable plate is formed at a position deviated from the hitting position, specifically, at a position eccentric from the axial center of the gas generator housing 12, it is not ruptured due to collision of the ball-like rupturing means 34.

Due to the rupture of the first rupturable plate 38, a combustion gas with a high temperature flows into the liquefied gas charged space 14, and a pressure and a temperature in the space 14 rise, and the third rupturable plate 80 is ruptured due to the rising pressure and temperature. Because of the rupture of the third rupturable plate 80, and the pressure inside the pressurized medium accommodating chamber 14 is rapidly reduced, the charged liquefied gas is gasified immediately to flow into the diffuser portion 30 from the openings 81 and 82. The gas is then discharged from the gas discharging ports 32 to inflate the air bag. In this case, the ball-like rupturing means 34 remains in the liquefied gas charged space 14 against an ejecting pressure of the gas owing to its own weight.

Similarly, the second igniter 46 is actuated upon receiving an actuation signal from the control unit with a slight delay from actuation of the first igniter 26 and burns the second gas generating agent 41 in the second gas generating chamber 40. The generated combustion gas flows into the second opening 50 to rupture the second rupturable plate 51 and flows into the pressurized medium accommodating chamber 14, and it is discharged together with the remaining liquefied gas from the gas discharging ports 32 to inflate the air bag.

Thus, by generating combustion gas in two stages, the hybrid type gas generator 300 described above prevents a delay in an air bag inflating operation at a time of a collision of a vehicle with an action of the first gas generating chamber 20 and discharges the pressurized medium in the gas generator housing 12 completely with an action of the second gas generating chamber 40, thereby allowing instantaneous inflation of the air bag to a sufficient degree of safety. Further, since two gas generating chambers are provided, a combustion gas may be generated only from the first gas generating chamber 20, or that combustion gas generating timings in the first gas generating chamber 20 and in the second gas generating chamber 40 are properly adjusted to a desirable interval.

Embodiment 3

Figure 4:
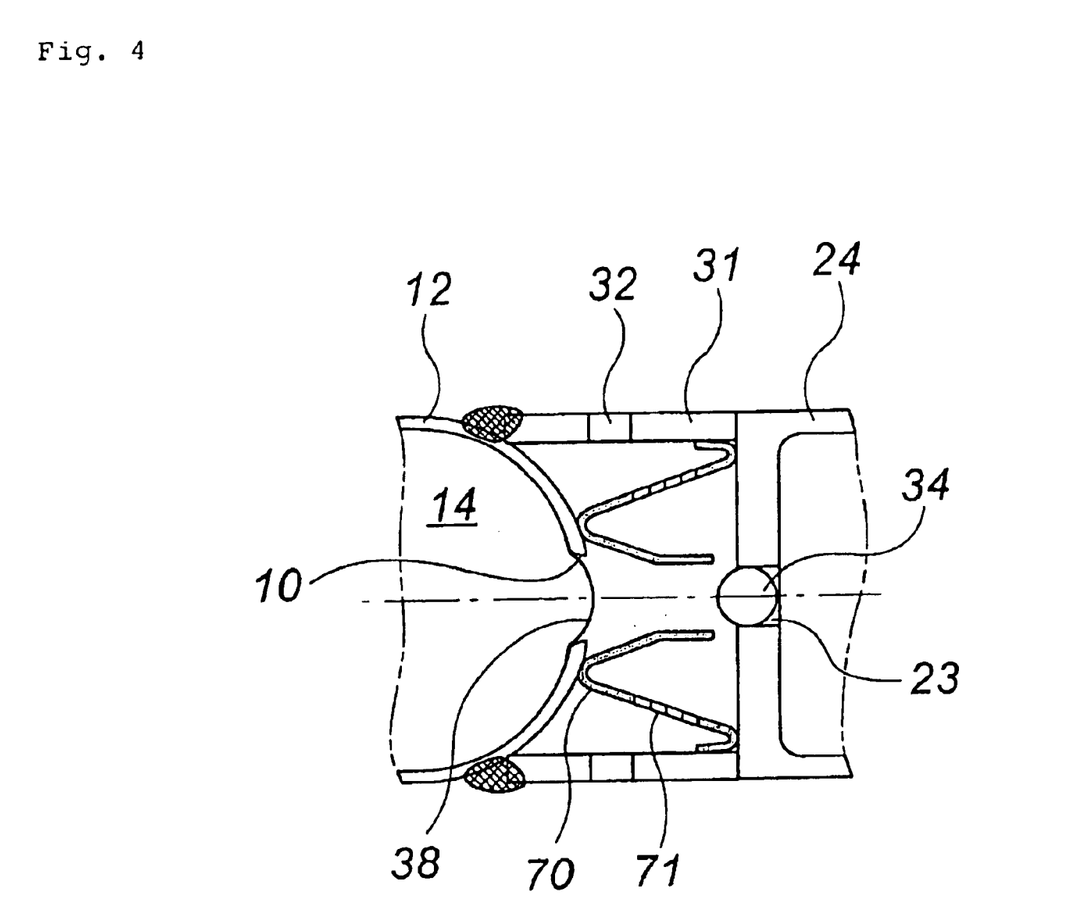
FIG. 4 is a partial sectional view of another embodiment in FIG. 1 or FIG. 3.
Figure 5:
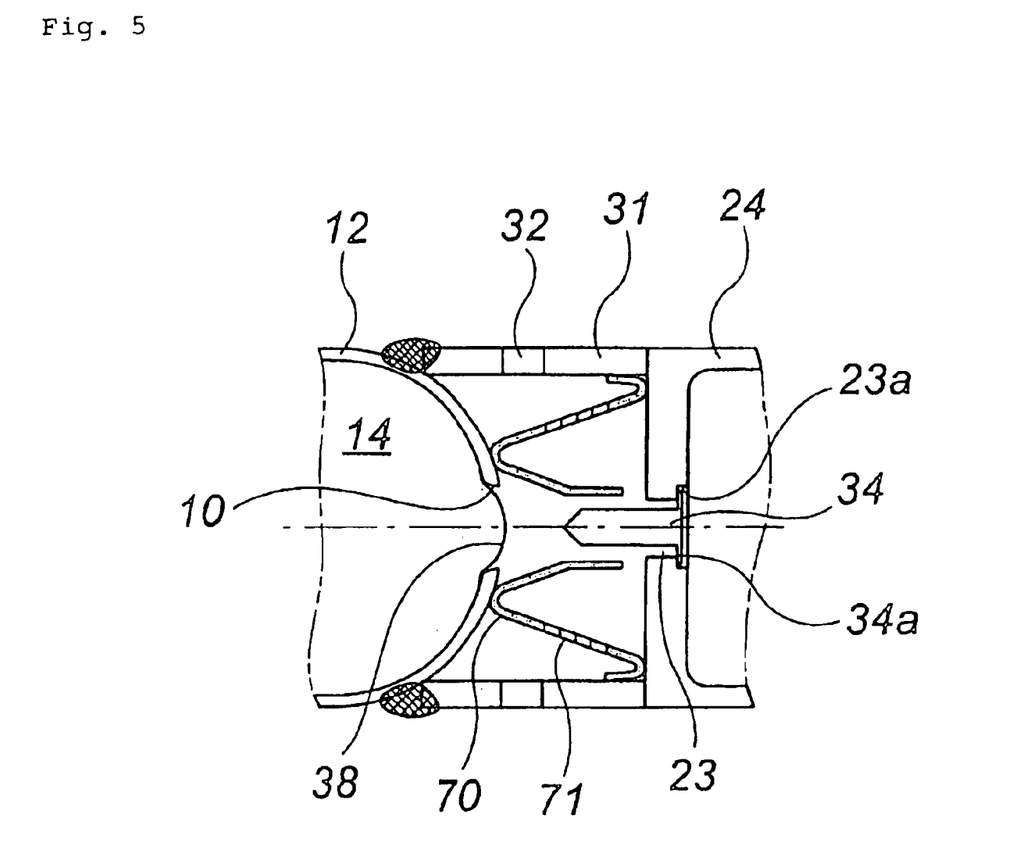
FIG. 5 is a partial sectional view of another embodiment in FIG. 1 or FIG. 3.
Figure 6:
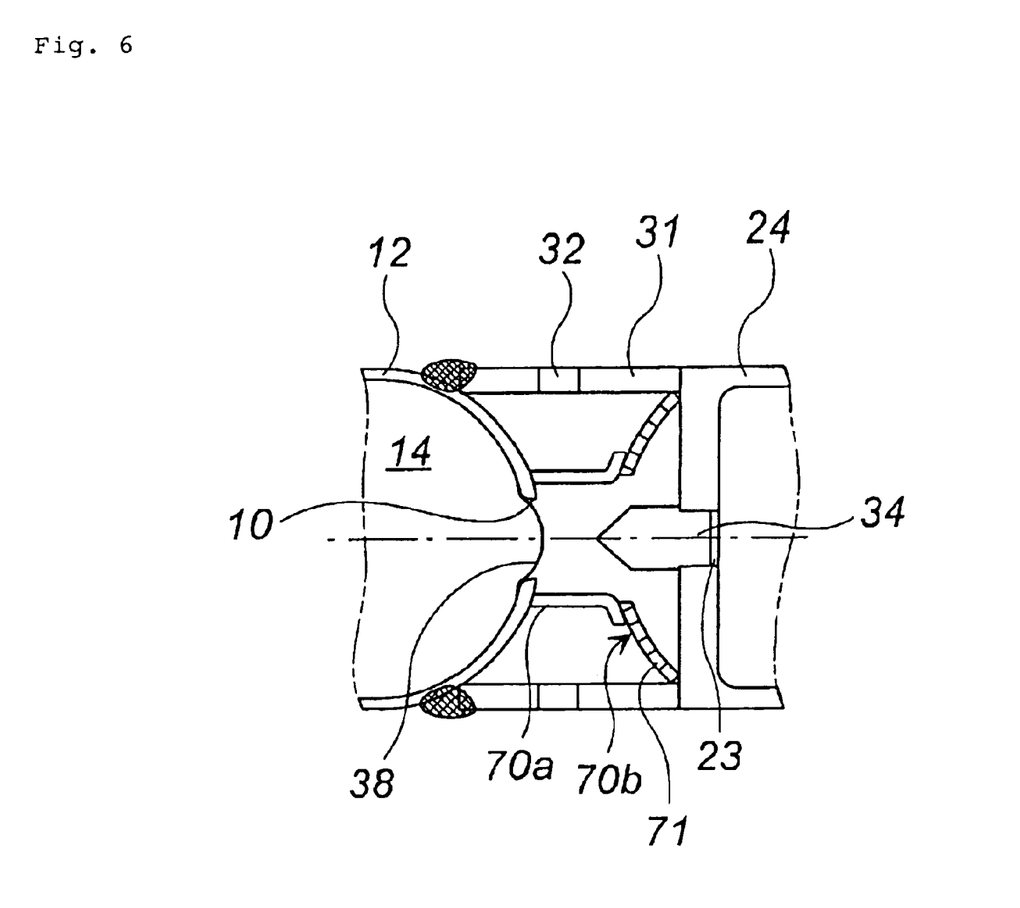
FIG. 6 is a partial sectional view of another embodiment in FIG. 1 or FIG. 3.

Next, as the rupturing means used as the moving body for rupturing the first rupturable plate 38, embodiments adopting different shapes will be explained with reference to FIG. 4 to FIG. 6. The respective rupturing means shown in FIG. 4 to FIG. 6 are made of the same metal as that of the first rupturable plate 38. The embodiments shown in FIG. 4 to FIG. 6 can be applied to the hybrid type gas generators shown in FIG. 1 and FIG. 3. In the following, a case such that the embodiments is applied to the hybrid type gas generator 200 will be explained.

In the embodiment shown in FIG. 4, the ball-like rupturing means 34 for the first rupturing plate 38 is held in the gas ejecting port 23 which communicates the first gas generating chamber housing 24 with the diffuser portion housing 31. At this time, the first gas generating chamber housing 24 is formed of metal such as stainless steel, so that the ball-like rupturing means 34 is pressed and held from an inner peripheral surface of the gas ejecting port 23 by setting the diameter of the ball-like rupturing means 34 slightly smaller than that of the gas ejecting port 23. The ball-like rupturing means 34 may be fixed using an adhesive. The ball-like rupturing means 34 also exhibits a moisture-proof function similar to the sealing tape 37 shown in FIG. 1;

An annular member 70 has the required number of gas flow holes 71, and it forms a guiding path for the ball-like rupturing 34 and a gas flow path, and it exhibits a filtering function for preventing pieces of the broken ruptured first rupturable plate 38 from flowing into the air bag.

The embodiment shown in FIG. 5 is similar to the embodiment shown in FIG. 4 except that arrowhead-like rupturing means 34 provided with a tapered projecting portion is used as the rupturing means which is the moving body for rupturing the first rupturable plate 38. The arrowhead-like rupturing means 34 has a flange-like base portion 34a and the flange-like base portion 34a is adhered to a stepped portion 23a provided in the gas ejecting port 23 by an adhesive. The flange-like base portion 34a of the arrowhead-like rupturing means 34 also exhibits a moisture-proof function similar to the sealing tape 37 shown in FIG. 1. Since a tapered portion (a projecting portion) which is a tip of the arrowhead-like rupturing means 34 and is formed at a portion opposite to the first rupturable plate 38 can concentrate a pressure to an extremely small area, the first rupturable plate 38 can be ruptured unfailingly.

In the embodiment shown in FIG. 6, the arrowhead-like rupturing means 34 provided with a tapered projecting portion similar to that shown in FIG. 5 is used as the rupturing means which is the moving body for rupturing the first rupturable plate 38, however, the embodiment shown in FIG. 6 is different in a method of mounting the arrowhead-like rupturing means to the gas ejecting port 23. The arrowhead-like rupturing means 34 shown in FIG. 6 is set such that its diameter in the base portion side is smaller than that in the arrowhead portion side, and it is fitted into the gas ejecting port 23 from the base portion. At this time, the arrowhead-like projectile 34 may be pushed and fixed by adjusting the diameter of the gas ejecting port 23 and the diameter of the base portion side or it can be fixed by using an adhesive. The arrowhead-like rupturing means 34 also exhibits a moisture-proof function similar to the sealing tape 37 shown in FIG. 1. Since the arrowhead-like rupturing means 34 is also formed at a tip portion opposite to the first rupturable plate 38 with a tapered portion (a projecting portion) and a pressure is concentrated to an extremely small area by this tapered portion. Thereby, the first rupturable plate 38 can be ruptured unfailingly.

Further, in the embodiment shown in FIG. 6, means comprising a combination of a first annular member 70*a*, forming a guiding path for the arrowhead-like rupturing means 34 and a gas flow path, and a second annular member 70*b*, having gas flow holes 71 and exhibiting a filtering function, is used instead of the annular member 70 shown in FIG. 4 and FIG. 5.

The hybrid type gas generator of each of the embodiments shown in FIG. 4 to FIG. 6 inflates as air bag according to a similar operation to that of the hybrid type 200 shown in FIG. 1. In the embodiment shown in FIG. 5, the flange-like base portion 34*a* of the arrowhead-like rupturing means 34 is pulled off when it is pressed by the combustion gas, and the remaining arrowhead-like portion is shot to collide against and rupture the first rupturable plate 38.

An air bag system according to the present invention is provided with actuation-signal outputting means comprising an impact sensor and a control unit, and a module accommodating the hybrid type gas generator 200 or 300 and an air bag in a module case. The hybrid gas generator 200 or 300 is connected to the actuation-signal outputting means (the impact sensor and the control unit) in the igniter 26 side (or in the first igniter 26 and the second igniter 46 side), and it is connected and fixed in the module case attached with the air bag by screwing a stud bolt. Then, in the air bag system having such a constitution, an amount of a gas to be generated and the inflating speed of the air bag can be adjusted according to a magnitude of an impact by setting output conditions of the actuation signal in the actuation-signal outputting means properly.

The gas generator for an air bag of the present invention can be applied to various gas generator including a gas generator for an air bag for a driver side, a gas generator for an air bag for a passenger side next to the driver, a gas generator for a side collision, a gas generator for a curtain air bag and the like.

What is claimed is:

1. A gas generator for an air bag, comprising:
   a pressurized medium accommodating chamber charged with a pressurized medium, and provided with a first opening formed in a first side thereof and a second opening formed in a second side thereof;
   a first gas generating chamber provided at the first side outside the pressurized medium accommodating chamber and separated by a first rupturable plate covering the first opening;
   a stationary member provided immovably with respect to the first combustion chamber and directly supporting only a single moving body facing the first rupturable plate, the single moving body adapted to be propelled by a product from the first gas generating chamber to rupture the first rupturable plate; and
   a second gas generating chamber located at the second side outside the pressurized medium accommodating chamber and separated by a second rupturable plate covering the second opening, the second opening being provided at a position deviated from a hitting portion of the single moving body.

2. A gas generator for an air bag according to claim 1, wherein the hitting portion exists on a first imaginary line extending from a second imaginary line connecting the single moving body and the first rupturable plate.

3. A gas generator for an air bag according to claim 1 or 2, wherein the single moving body has a projecting portion formed in one of a spherical shape and a tapered shape, and disposed such that the projecting portion faces the first rupturable plate.

4. A gas generator for an air bag according to claim 1 or 2, wherein the pressurized medium accommodating chamber has a column shape, and the second opening is formed at the second side opposing the first side.

5. A gas generator for an air bag according to claim 1 or 2, wherein the single moving body is propelled by a pressure generated inside the first gas generating chamber and enters the pressurized medium accommodating chamber.

6. A gas generator for an air bag according to claim 1 or 2, wherein an igniter actuated upon receiving an actuation signal, or the igniter and a gas generating agent burnt by actuation of the igniter are disposed in at least one of the first gas generating chamber and the second gas generating chamber.

7. A gas generator for an air bag according to claim 1 or 2, further comprising:
   a gas outlet chamber provided between the first gas generating chamber and the pressurized medium accommodating chamber, the gas outlet chamber provided with a plurality of gas discharging ports formed in a peripheral wall thereof for releasing the pressurized medium and gasses generated in the first combustion chamber and the second combustion chamber.

8. A gas generator for an air bag according to claim 7, wherein the stationary member is fixedly provided inside the gas outlet chamber, and the stationary member directly holds the single moving body, such that single moving body is provided in a flow path, connecting the first gas generating chamber and the first opening, for the pressurized medium and the gasses generated in the first combustion chamber.

9. A gas generator for an air bag according to claim 1 or 2, further comprising:
   a single ejecting port formed in the first gas generating chamber for discharging the product to propel the single moving body,
   wherein a center axis of the gas ejecting port, a center of the single moving body, and a center of the first rupturable plate are arranged substantially on a common imaginary straight line.

10. A gas generator for an air bag according to claim 9, wherein the single moving body faces the single gas ejecting port or is fitted therein.

11. A gas generator for an air bag according to claim 1 or 2, wherein the second rupturable plate is ruptured by heat or pressure of a gas ejected from the second gas generating chamber.

12. An air bag system, further comprising:
   actuation-signal outputting means including an impact sensor and a control unit;
   a module case accommodating the gas generator according to claim 1 or 2; and
   an air bag.

13. A gas generator for an air bag, comprising:
   a gas generator housing defining therein a pressurized medium accommodating chamber that accommodates a pressurized medium, and having a first opening and a second opening;

a first gas generating chamber containing a first gas generating agent and adapted to be in communication with the pressurized medium accommodating chamber through the first opening;

a second gas generating chamber containing a second gas generating agent and adapted to be in communication with the pressurized medium accommodating chamber through the second opening;

a first rupturable plate for hindering the communication between the first combustion chamber and the pressurized medium accommodating chamber;

a diffuser housing provided between the first combustion chamber and the gas generator housing;

a supporting member provided inside the diffuser housing and having a cylinder portion for allowing a gas generated inside the first combustion chamber to flow towards the first opening a diameter of the cylinder portion increases as a distance to the gas generator housing decreases;

a moving body provided inside the cylinder portion and adapted to rupture the first rupturable plate and enter into the pressurized medium accommodating chamber when the gas generated inside the first combustion chamber is introduced to the cylinder portion; and a second rupturable plate that seals the second opening, the second opening being provided at a hitting position deviated from a position where the moving body hits after rupturing the first rupturable plate and entering the pressurized medium accommodating chamber.

14. A gas generator for an air bag according to claim 13, wherein the first rupturable plate is attached directly to the gas generator housing to seal the first opening.

15. A gas generator for an air bag according to claim 13 or 2, wherein moving body has a pointed projecting portion that faces the first rupturable plate.

16. A gas generator for an air bag according to claim 7, wherein the supporting member divides the gas outlet chamber into a first chamber which accommodates the moving body, and a second chamber in communication with an outside of the diffuser housing through the plurality of gas discharge ports, wherein the gas generator housing has a third opening sealed by a third rupturable plate and adapted to communicate the pressurized medium accommodating chamber with the second chamber, and wherein the cylinder portion is a combustion gas introducing pipe that defines the first chamber and accommodates the moving body therein, the combustion gas extends between the first combustion chamber and the gas generator housing, such that all the gas discharged from the first combustion chamber is introduced into the pressurized medium accommodating chamber.

17. A gas generator for an air bag according to claim 16, wherein the first rupturable plate is attached to an end of the combustion gas introducing pipe facing away from the first combustion chamber.

18. A gas generator for an air bag, comprising:

a gas generator housing defining therein a pressurized medium accommodating chamber that accommodates a pressurized medium, and having a first opening and a second opening;

a first gas generating chamber containing a first gas generating agent, and adapted to be in communication with the pressurized medium accommodating chamber through the first opening, the first gas generating chamber having a partition wall defining a gas ejecting port for ejecting a gas generated inside the first gas generating chamber;

a second gas generating chamber containing a second gas generating agent and adapted to be in communication with the pressurized medium accommodating chamber through the second opening;

a first rupturable plate for hindering the communication between the first gas generating chamber and the pressurized medium accommodating chamber;

a diffuser housing provided between the first gas generating chamber and the gas generator housing; and a moving body provided inside the diffuser housing and supported directly by the partition wall where the partition wall defines the gas ejecting port, such that the moving body ruptures the first rupturable plate and enters into the pressurized medium accommodating chamber when the gas is generated inside the first combustion chamber; and a second rupturable plate that seals the second opening, the second opening being provided at a position deviated from a hitting position where the moving body hits after rupturing the first rupturable plate and entering the pressurized medium accommodating chamber.

19. A gas generator for an air bag according to claim 18, wherein the moving body has one of a spherical shape and a tapered shape with a pointed end facing the first rupturable plate.

20. A gas generator for an air bag, comprising:

a gas generator housing defining therein a pressurized medium accommodating chamber that accommodates a pressurized medium, and having an opening;

a gas generating chamber containing a gas generating agent and adapted to be in communication with the pressurized medium accommodating chamber through the opening;

a rupturable plate for hindering the communication between the gas generating chamber and the pressurized medium accommodating chamber;

a diffuser housing provided between the first gas generating chamber and the gas generator housing;

a supporting member provided inside the diffuser housing and having a cylinder portion for allowing a gas generated inside the combustion chamber to flow towards the first opening, a diameter of the cylinder portion increases as a distance to the gas generator housing decreases; and a moving body provided inside the cylinder portion and adapted to rupture the rupturable plate and enter into the pressurized medium accommodating chamber when the gas generated inside the combustion chamber is introduced to the cylinder portion.

* * * * *